May 19, 1964 K. CHVATLINSKY 3,133,621
CARRIAGE MOVEMENT CONTROL ARRANGEMENT
Filed May 1, 1961 6 Sheets-Sheet 1

INVENTOR.
Kurt Chvatlinsky
BY
Michael S. Striker

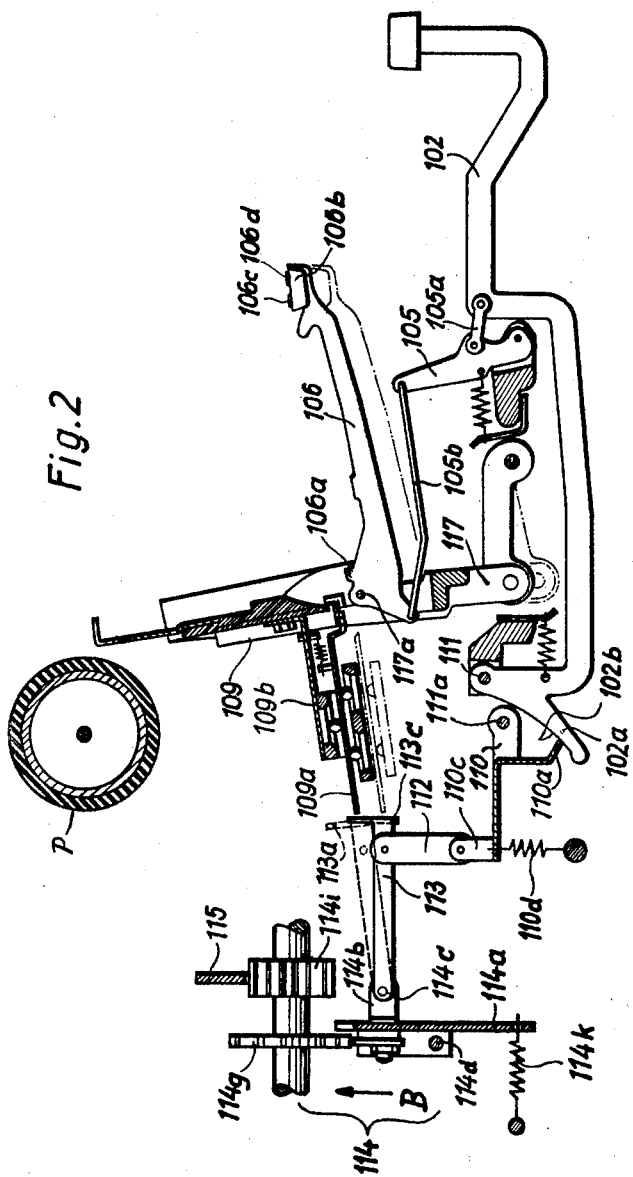

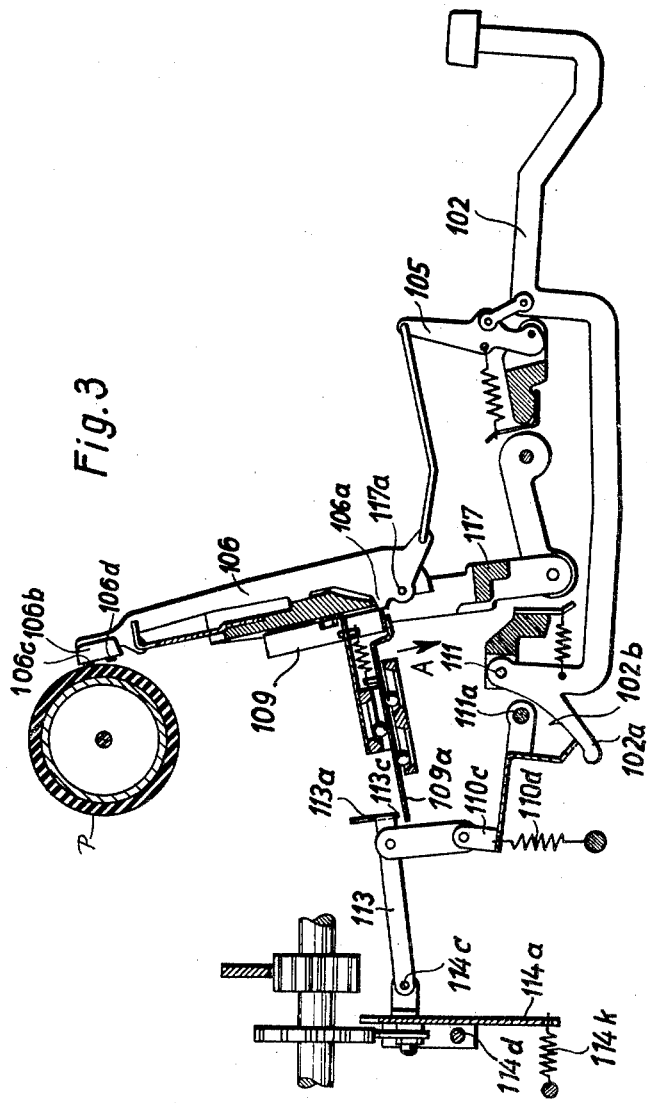

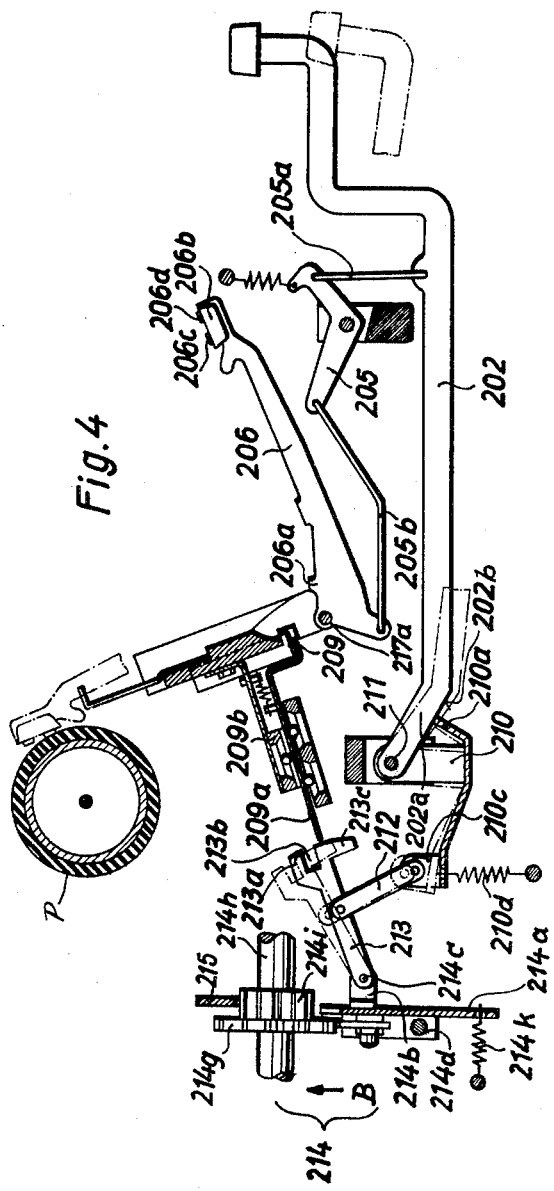

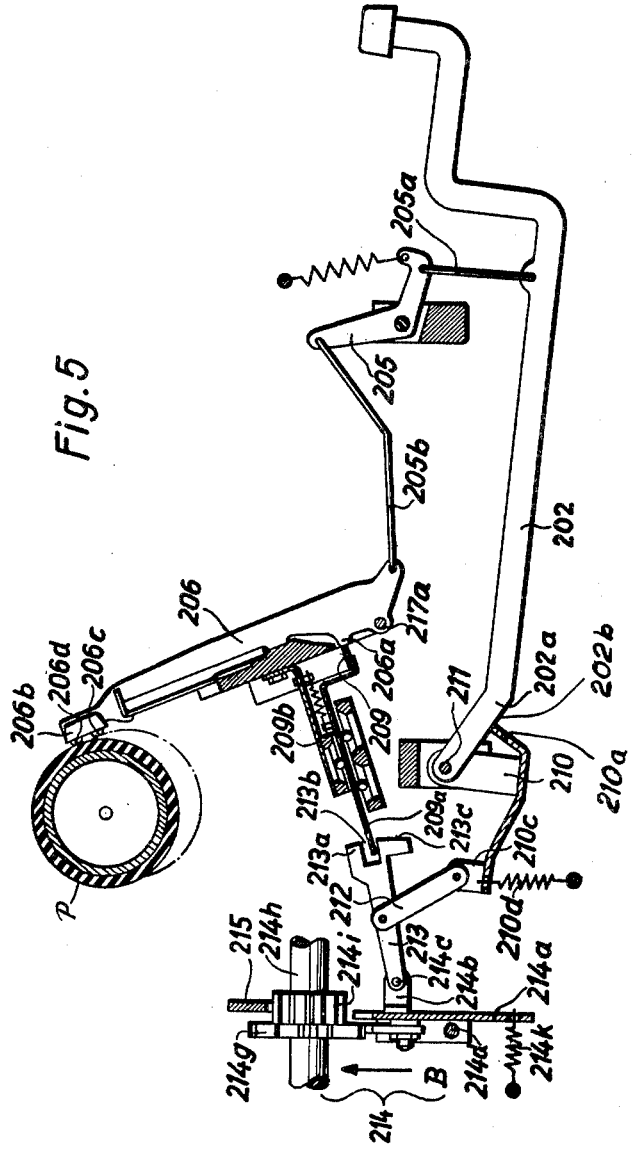

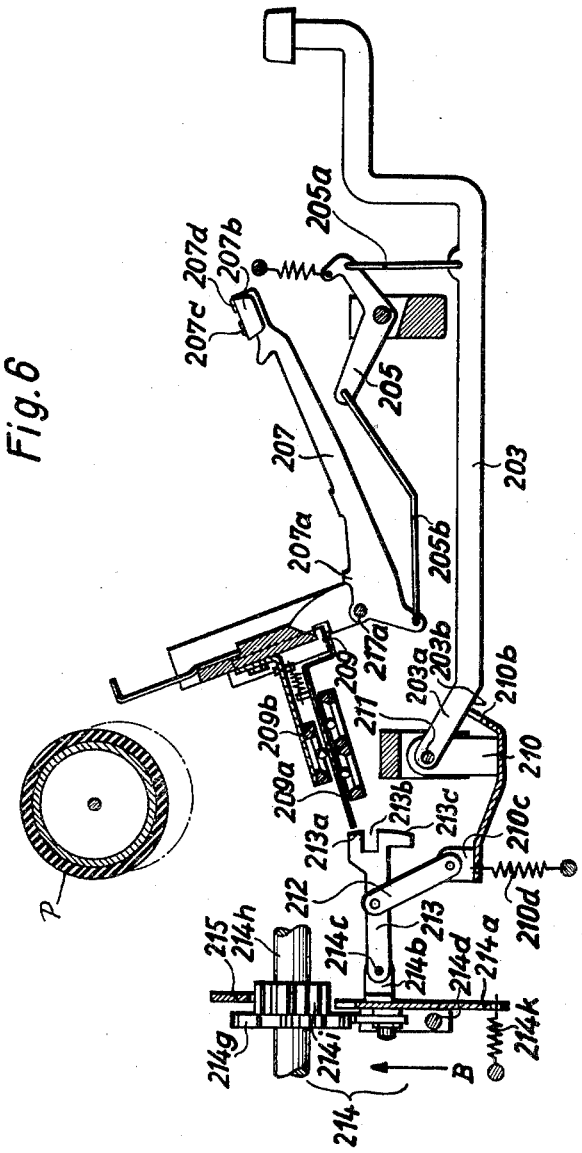

United States Patent Office 3,133,621
Patented May 19, 1964

3,133,621
CARRIAGE MOVEMENT CONTROL
ARRANGEMENT
Kurt Chvatlinsky, Wilhelmshaven, Germany, assignor to
Olympia Werke AG., Wilhelmshaven, Germany
Filed May 1, 1961, Ser. No. 106,611
Claims priority, application Germany Apr. 29, 1960
18 Claims. (Cl. 197—83)

The present invention relates to a carriage movement control arrangement which is particularly suitable for use in typewriters on which Asiatic characters are to be typed.

Asiatic characters must be composed on a typewriter by superimposing several characters, considering that a typewriter of the conventional construction has only 46 keys and 92 characters or symbols.

Typewriters for Asiatic characters are advantageously provided with dead keys whose type lever actions effect no carriage steps and with partly dead keys whose type lever actions effect a carriage step either only in the lower case position, or only in the upper case position. Of course, standard type lever actions which effect a carriage step in the upper and in the lower case position, are also provided.

For example, if a key of this type is provided in a conventional typewriter, it will effect a step of the paper carriage, and transport of the paper after an imprint has been made in the lower case position. However, when an imprint is made in the upper case position of the typewriter, the carriage does not move, and the next imprint is superimposed on the preceding imprint.

It is one object of the present invention to improve known typewriters serving the purpose of printing Asiatic characters, and to provide a typewriter which can be mass-produced of standard parts which are normally used for conventional typewriters, and requires only few new special parts which can be easily assembled with standard parts.

Another object of the present invention is to provide a carriage movement control arrangement provided with a single device by which the carriage is controlled to make a step, or to remain at a stand-still, depending on whether a conventional key, or a dead key was operated.

Another object of the invention is to effect through the same device a carriage step in the lower case position, and no carriage step in the upper case position, or vice versa, if special "partly dead" keys are operated.

Another object of the invention is to provide an arrangement for the above defined purpose capable of being operated by standard keys, partly dead keys, and dead keys which may be disposed on the typewriter in any desired arrangement.

For example, the type lever actions of standard keys, of partly dead keys, and of dead keys may be arranged in a row on a standard type lever carrier, and control the carriage movement in accordance with the desired function.

With these objects in view, the present invention relates to a carriage movement control arrangement which is particularly suited for typewriters used for typing Asiatic characters. One embodiment of the invention comprises a paper carriage element and a type lever carrier element; an escapement member connected to the carrier element and being shiftable for effecting a carriage step; a shiftable control member; a plurality of type lever actions shifting the control member when operated; coupling means for connecting and disconnecting, respectively, the control member with the escapement member; and means for connecting the type lever actions with the coupling means for shifting the same when the type lever actions are operated.

Either the carriage element, or the type lever carrier element, is shiftable relative to the other element between a lower case position and an upper case position. In conventional typewriters, capital letters and symbols are typed in the upper case position, and small letters and numerals are typed in the lower case position. In typewriters for Asiatic characters, different character parts are provided on the types of the type levers for being imprinted in the lower case position and in the upper case position, respectively.

If the paper carriage is shifted between the upper case and lower case position, the escapement member moves with the same. If the type lever carrier element is shifted between the lower case position and the upper case position, then the control member is secured to and moves with the type lever carrier element.

The coupling means preferably include a lever pivotally mounted on the escapement member and having a coupling abutment located opposite the control member so that the coupling member, and the escapement member are shifted to effect a carriage step when a type lever action is operated and shifts the control member.

The coupling means have a first position connecting the control member with the escapement member in the lower and in the upper case positions, and a second position connecting the control member with the escapement member only in the lower case position and disconnecting the control member from the escapement member in the upper case position. Since the paper carriage moves one step only when the escapement member is actuated by the shifted control member, the paper carriage does not move one step when the control member is disconnected from the escapement member by the coupling means. Such disconnection is effected by selected type lever actions which shift the coupling means to the disconnecting position, whereas the standard type lever actions are not connected to the coupling means in this manner, and consequently do not shift the coupling means to the disconnecting position. Consequently, standard type lever actions will effect shifting of the paper carriage in the lower and upper case positions, whereas the special "partly dead" keys will effect a stepwise movement of the carriage either in the lower case position or in the upper case position.

The typewriter is also provided with "dead" keys which are not connected at all to the control member, and do not shift the same, when operated. Consequently, irrespective of the position of the coupling means, the escapement member cannot be actuated to effect a carriage step.

The linkage between the coupling means and the various type lever actions, preferably includes a member extending across the type lever actions, and having recesses opposite standard type lever actions, so that actuation of the same will not displace the linkage and effect shifting of the coupling means. The special "partly dead" keys are located opposite projections of the linkage member, and consequently shift the same and thereby the coupling means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary side view, partially in section, illustrating one embodiment of the invention in a normal position of rest;

FIG. 3 is a fragmentary side view, partially in section, illustrating the embodiment of FIG. 2 in the upper case position and with a type lever action actuated;

FIG. 4 is a fragmentary side view, partially in section, illustrating another embodiment of the invention in a normal position of rest, the section being taken to show a "partly dead" key;

FIG. 5 is a fragmentary side view, partially in section, illustrating the embodiment of FIG. 4 in the upper case position and with the type lever action actuated; and FIG. 6 is a fragmentary side view, partly in section, illustrating the embodiment of FIG. 4, the section being taken to show a standard type lever action.

Figure 1:
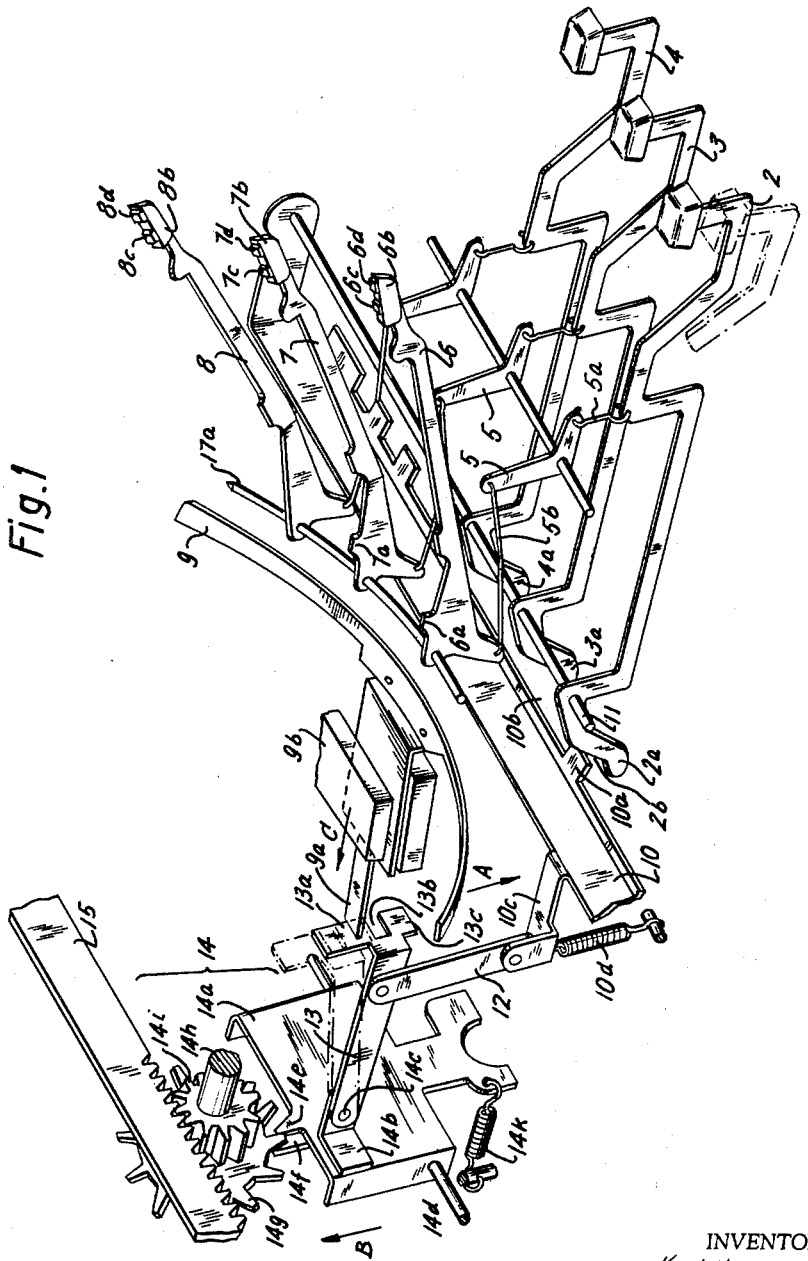
FIG. 1 is a fragmentary perspective view illustrating a mechanism according to the present invention which may be used in typewriters in which the upper and lower case positions are obtained by shifting the paper carriage, or in typewriters in which the upper and lower case positions are obtained by shifting the type lever carrier.

Referring to the drawings, and particularly to FIG. 1 which is provided to illustrate the principle of the invention, three key levers 2, 3 and 4 are shown to be mounted for turning movement on a shaft 11. As will become apparent as the description of the mechanism proceeds, key 2 is a "partly dead" key, key 3 is a standard key, and key 4 is a "dead" key.

Key levers 2, 3 and 4 have standard projections 2a, 3a, and 4a at the ends, and are connected by intermediate levers 5 and connecting wire links 5a, 5b to type levers 6, 7, and 8 which are mounted for turning movement on a common shaft 17a. Types 6b, 7b, and 8b are secured to the free ends of the type levers, and carry, respectively, lower case characters 6c, 7c and 8c and upper case characters 6d, 7d and 8d. A substantially T-shaped control member 9 has an arcuate part located opposite the projections 6a and 7a of the type levers 6 and 7, and being engaged by the same when their respective key levers 2 and 3 are operated. Engagement between projections 6a or 7a and control member 9 will effect shifting of control member 9 in the direction of the arrow C while being guided by a guide means 9b which is mounted in the type lever carrier of the machine.

The paper carriage of the machine, not shown, carries a rack bar 15 meshing with a pinion 14i on a shaft 14h. An escapement wheel 14g is secured to pinion 14i, and cooperates with a fixed projection 14e and a movable projection 14f of an escapement member 14a. Escapement member 14a is mounted on a shaft 14d for turning movement, and is urged by spring 14k to turn in clockwise direction as viewed in FIG. 1. A bracket 14b is secured to escapement member 14a, and a coupling lever 13 is mounted for pivotal movement on a pin 14c on bracket 14b. The free end of the coupling lever 13 carries an abutment plate including a plate portion 13a and a plate portion 13c which are separated by a recess or cutout 13b. Control member 9 has a projection 9a positioned to engage the coupling abutment 13a, 13b.

A lever means 10 includes an engaging portion extending across the type lever actions and two arms, of which only one is shown in FIG. 1, for turnably mounting lever means 10 on shaft 11. Lever means 10 has an arm 10c pivotally connected by a link 12 to a coupling lever 13. A spring 10d is connected to the lever means 10 and to link 12, and urges lever means 10 to turn in counterclockwise direction about shaft 11, and to pull coupling lever 13 downward to the illustrated position in which control projection 9a is located opposite plate portion 13a.

Engaging member 10 has projections 10a and recesses 10b. Projections 10a are provided only opposite "partly dead" key levers, of which only one key lever 2 is shown. When key lever 2 is operated, its projecting portion 2a engages projection 10a and turns lever means 10 in clockwise direction about shaft 11 so that coupling lever 13 is raised through link 12 and arm 10c to a higher position displaced relative to control member 9, 9a.

Assuming that the mechanism of FIG. 1 is provided in a typewriter whose paper carriage is shifted from the lower case position to the upper case position, then rack bar 15, and the entire escapement mechanism 14 will be moved in the direction of the arrow B if the conventional shift key of the typewriter is actuated. Assuming, however, that the mechanism of FIG. 1 would be provided in a typewriter in which the type lever 7 is shifted between a lower case position and an upper case position, then guide means 9b with control member 9 and shaft 17a will be lowered to the upper case position in the direction of arrow A when the shift key of the typewriter is operated.

In the construction in which the type lever carrier is shifted to an upper case position, control member 9, 9a will engage plate portion 13a in the upper case position and in the lower case position when a standard key 3 is depressed, since the projection 7a will engage the arcuate part of control member 9. The length of plate portion 13a is chosen so that control projection 9a is located opposite the same in both shifted position of the type lever carrier.

When a dead key 4 is operated, control member 9 will not be shifted since type lever 8 has no projection corresponding to projection 7a.

If a "partly dead" key 2 is operated, projection 6a will shift control member 9, 9a, but edge face 2b of projection 2a of key lever 2 will turn lever means 10 so that coupling lever 13 is raised and the recess 13b is located opposite control portion 9a. Consequently the advance of control member 9, 9a will have no effect on the coupling means 13. If plate portion 13a is pushed back by control member 9, 9a, escapement member 14a will turn in counterclockwise direction about shaft 14d, projection 14e will release the respective tooth of escapement wheel 14g, and movable escapement member 14f will engage the respective tooth, permitting the escapement wheel 14g to perform a single step which corresponds to a movement of the paper carriage through one step since pinion 14i advances rack bar 15 one step. When the respective key is released, spring 10d returns coupling lever 13 to its normal position, and spring 14k returns escapement member 14a to its normal position so that the carriage movement is stopped after a single step.

Assuming that the mechanism of FIG. 1 is used in a machine in which the carriage is raised to the upper case position, then the control portion 9a of control member 9 will be located opposite the plate portion 13c in the lower case position of the machine. When the carriage is raised to the upper case position, lever 13 will turn about the pivot connecting it with link 12 so that the abutment plate of the coupling means 13 is lowered, and control portion 9a is located opposite recess 13b. This arrangement will be explained in greater detail with reference to FIGS. 4 to 6.

It will be understood that FIG. 1 is provided for the purpose of illustrating the principle of the invention, and that in the actual embodiment of the machine, either the paper carriage, or the type lever carrier, is shifted between the lower case position and the upper case position, while the respective other element is stationary.

Referring now to FIGS. 2 and 3 which illustrate an embodiment of the invention in which the type lever carrier is shiftable between a higher lower case position and a lower upper case position, it will be noted that parts corresponding to parts of FIG. 1 are designated by similar reference numerals. Consequently, the key lever 102 is associated with a "partly dead" key. Standard keys and "dead" keys may be provided in a row with key lever 102, as shown in FIG. 1.

Key lever 102 is mounted on the frame of the machine for turning movement about a shaft 111 and it is connected by a link 105a to an intermediate lever 105 connected by a link 105b to the type lever 106 which is turnable about a curved shaft 117a mounted in the type lever carrier 117. A type 106b having lower and upper case characters 106c and 106d is secured with a free end of type lever 106. Type lever carrier 117 is shiftable from the lower case position shown in solid lines in FIG. 2 to the upper case position shown in broken lines in FIG. 2 and in solid lines in FIG. 3. Such shifting is accomplished by conventional means under control of the conventional shift key, not shown.

When key lever 102 is operated, the edge face 102b of projection 102a turns the lever means 110, 110a, 110c about shaft 111a so that link 112 moves the coupling lever 113 from the position illustrated in solid lines to the higher displaced position illustrated in broken lines. When key lever 102 is released, spring 110d returns coupling lever 113 to its normal position. An escapement member 114a is turnable about a pivot pin 114d and is urged by a spring 114k to the illustrated position. The escapement mechanism 114 corresponds to the escapement mechanism 14 described with reference to FIG. 1 and includes an escapement wheel 114g connected to a pinion 114i which meshes with the rack bar 115 of a paper carriage not shown, which also supports a platen P.

When a "partly dead" key, for example key lever 102, is operated while the machine is in the lower case position, as illustrated in FIG. 2, coupling lever 113 is turned about pin 114c on bracket 114b to the position shown in broken lines so that the lower portion of coupling plate 113a is located opposite control portion 109a. When projection 106a engages the arcuate portion of control member 109, a control portion 109a is shifted to the left as viewed in FIG. 2, abuts and engages plate portion 113a, with its edge face 109b shifts coupling lever 113 to the left, and turns escapement member 114a in counterclockwise direction so that the carriage performs a single step as is desired in the lower case position when a "partly dead" key is actuated.

When the type lever carrier or type bar segment 117 is lowered to the position illustrated in FIG. 2 in broken lines and in FIG. 3 in solid lines, then control portion 109a assumes the position shown in broken lines in FIG. 2, and in solid lines in FIG. 3. When a "partly dead" key, for example key lever 102, is operated in this upper case position of the machine, control member 109, 109a is shifted to the left, as best seen in FIG. 3. However, since projection 102a has raised coupling lever 113 and coupling plate 113a through lever means 110c, the advancing control portion 109a moves past the coupling plate 113a, and is incapable of shifting coupling lever 113 to the left, or of turning escapement member 114a. Consequently, the carriage performs no step when a "partly dead" key is operated in the upper case position of the machine.

A dead key, not shown in FIGS. 2 and 3, has no projection 106a, so that control member 109 is not shifted at all, irrespective of whether the machine is in the upper case position or in the lower case position.

A standard key, for example key 3 shown in FIG. 1 has a projection 3a located opposite a recess 10b in lever means 10. Consequently lever means 10 is not turned when a normal key 3 is operated.

The arrangement in FIG. 2 is the same, although no standard key is illustrated for the sake of clarity. However, it will be understood that upon operation of a standard key, lever means 110 will not be turned. Assuming that the machine is in the lower case position shown in FIG. 2, coupling lever 113 will remain in its normal position, and the upper portion of coupling plate 113a will be located opposite control portion 109a. Consequently, operation of the standard key will effect shifting of control member 109, 109a and shifting of coupling lever 113 to the left together with the upper part of escapement member 114a so that the carriage is shifted one step in the lower case position.

In the upper case position of the machine, the type lever carrier 117 is lowered to the position illustrated in broken lines in FIG. 2. Control member 109, 109a will be in the lower position illustrated in broken lines in FIG. 2, and be located opposite the lower portion of the coupling plate 113a. Consequently, operation of a standard key in the upper case position of the machine will also effect a carriage step, since the lowered control member 109 will shift coupling lever 113 by engaging the lower portion of coupling plate 113a.

The embodiment illustrated in FIGS. 4 to 6 applies the invention to a typewriter in which the carriage is raised for placing the platen in the proper position for cooperation with the upper case type faces. FIGS. 4 and 5 show a "partly dead" key 202, while FIG. 6 shows a standard key 203. These keys, as well as "dead" keys are arranged in any selected order on an arcuate shaft 211 which is mounted on a frame part of the machine. The type lever action of the "partly dead" key 202 includes lever 205, links 205a and 205b, and a type lever or type bar 206 with a type 206b provided with lower and upper case type faces 206c and 206d. The type lever 206 has a projection 206a cooperating with the arcuate portion of the control member 209, as shown in FIG. 1 for the elements 6a and 9. The type lever action of a standard key shown in FIG. 6 includes a type lever 207 with a type 207b having upper and lower type faces 207c, 207d. Control member 209 is mounted in a guide means 209b for movement toward the coupling abutment 213a, 213c, and is normally located opposite the upper part of the plate portion 213c, as shown in FIG. 4. Between plate portion 213a and plate portion 213c a recess 213b is located. Coupling lever 213 is pivotally mounted on a pivot pin 214c which is disposed on a bracket 214b mounted on the escapement member 214a. Escapement member 214a is mounted on the carriage not shown, for turning movement about a pin 214d and is urged by spring 214k to assume the position illustrated in FIGS. 4 to 6 in which the escapement wheel 214g is locked together with pinion 214i so that the rack bar 215 of the carriage, not shown, cannot move with the platen P. Shaft 214 is mounted on the carriage and carries pinion 214i and escapement wheel 214g.

A link 212 connects coupling lever 213 to a lever means 210 which is mounted for turning movement on shaft 211. A transverse engaging portion 210a of lever means 210 extends across all key levers 202 and 203. As explained with reference to FIG. 1, key levers of "partly dead" keys have parts 202a with faces 202b located opposite projections 210a of the engaging portion of lever means 210, whereas the corresponding face 203b of part 203a of standard key levers are located opposite recesses 210b of the transverse engaging member, as best seen in FIG. 6. It is evident that depression of a "partly dead" key 202 will effect turning movement of lever means 210 in clockwise direction to raise coupling lever 213, whereas depression of a standard key 203 will have no influence on lever means 210 since portion 203a will pass into the respective opposite recesses 210b. Spring 210d biases lever means 210 to remain in the normal position in which the projections 210a abut key levers 202 which are in the normal position of rest.

FIG. 4 shows the mechanism in the lower case position of the typewriter, and the key lever 202 in its normal position of rest. Control portion 209a is located opposite the upper part of plate portion 213c. When key lever 202 is operated, part 202b will engage projection 210a and turn lever means 210 so that coupling lever 213 is raised one step to a position in which control portion 209a is located opposite the lower part of plate portion 213c which is correspondingly elongated. Movement of the type lever 206 will bring projection 206a into engagement with the arcuate part of control member 209, and move control portion 209a into engagement with the lower part of plate portion 213c so that coupling lever 213 moves to the left and turns escapement member 214a in counterclockwise direction about shaft 214d. This will result in a step of the carriage, as is desired for the lower case position of a "partly dead" key. Upon release of the key by the operator, the parts will return to their normal position under the action of springs 214k and 210d, so that the carriage movement will be limited to a single step.

If a standard key, not shown in FIG. 4, is operated in the lower case position of FIG. 4, its portion 203a will pass into the respective recess 210b, and lever means 210 will not be turned, as explained above with reference to FIG. 6. Consequently, coupling lever 213 will remain in the position of FIG. 4, and when the coupling member 209, 209a is advanced by engagement with the projection 207a, control portion 209a will engage the upper part of the control plate portion 213c, shift coupling lever 213, as is desired for the lower case position of a standard key.

In the upper case position of the machine, shown in FIGS. 5 and 6, the escapement mechanism 214 has been raised with the carriage in the direction of the arrow B, so that the platen P is displaced from its normal lower case position shown in broken lines to the upper case position shown in solid lines in FIGS. 5 and 6.

Raising of the escapement member 214a effects turning of coupling lever 213 with the pivots of link 212 serving as fulcrums while lever means 210 is in the normal position shown in FIG. 6 in which it is held by spring 210d. The coupling abutment at the free end of coupling lever 213 is turned to the position shown in FIG. 6 in which the plate portion 213a is located opposite control portion 209a of control member 209, 209a.

If a standard key 203 is operated in this upper case position of the machine, its portion 203a will pass into a recess 210b, and lever means 210 will not be turned so that coupling lever 213 remains in the position of FIG. 6. When portion 207a of the type lever engages the arcuate part of control member 209, control portion 209a is advanced and engages plate portion 213a so that coupling lever 213 is shifted to the left and escapement member 214a is turned in counterclockwise direction to effect a single carriage step, as is desired for the upper case position of a standard key.

When a "partly dead" key 202 is operated in the upper case position shown in FIG. 5, its portion 202a engages a projection 210a and turns lever means 210 in clockwise direction so that link 212 raises coupling lever 213 one step, whereas the shifting of the carriage to the upper case position had lowered coupling lever 213 two steps. Thus, coupling lever 213 assumes the position of FIG. 5 under the influence of the carriage shifted to the upper case position and of lever means 210 shifted by operation of a "partly dead" key. When type lever 206 turns to its printing position, its projection 206a engages the arcuate part of control member 209, and advances control portion 209a. However, since control portion 209a is located opposite recess 213b, its movement is ineffective, and coupling lever 213 will not be displaced so that the carriage will not perform a transporting step, and operation of a "partly dead" key in the upper case position of the machine will not effect a transporting step of the carriage.

FIGS. 2 to 6 do not show a "dead" key, but it will be understood with reference to FIG. 1 which combines both embodiments to illustrate the principle of the invention, that dead keys corresponding to dead key 4 and having type levers 8 can be mounted on the arcuate shafts 111 and 211 of FIGS. 2 and 4, respectively. Such "dead" keys have no projections corresponding to projections 6a, 7a, 106a, 206a, and 207a, and consequently will not effect shifting of the control member 109 or 209 so that, irrespective of the relative position of all other elements of the mechanism, the escapement mechanism 114 or 214 is not actuated by the operation of a "dead" key so that, irrespective of whether the machine is in the lower case position or in the upper case position, the carriage will not perform a transporting step.

From the above description, it will become apparent that the general construction of a conventional typewriter need not be changed for adapting the typewriter to Oriental or Asiatic characters. Type levers can be made "dead" by removing the projection 6a or 7a, while any standard key lever can be used for the "partly dead" key by providing a corresponding projection on the engaging portion of lever means 210. Standard type lever actions, "partly dead" type lever actions, and "dead" type lever actions can be all mounted in any desired order with the respective type levers mounted for turning movement on the standard arcuate shaft 17a, 117a, 217a in the type lever carrier. The same parts of the mechanism can be used for typewriters in which the carriage is shifted between lower and upper case positions, and for typewriters in which the type lever carrier is shifted between these positions.

It will be understood that each of the elements described above, or two or more together, may also find a useful application in other types of typewriters differing from the types described above.

While the invention has been illustrated and described as embodied in a carriage shifting control arrangement for a typewriter adapted to Asiatic characters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a typewriter, in combination, a carriage movement control arrangement comprising a carriage element and a type lever carrier element, one of said elements being shiftable relative to the other element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting one of said members for movement with said shiftable element in said first direction between a lower case position and an upper case position; a plurality of type lever actions, each type lever action including a part for shifting said control member in said second direction when said type lever action is operated; coupling means having a first position connecting said control member with said escapement member in both case positions of said one movable member so that said escapement member effects a carriage step when said control member is shifted by said part of a type lever action, and having a second position connecting said control member with said escapement member in the case position of said one movable member and disconnecting said control member from said escapement member in the other case position of said one movable member; and means for connecting selected type lever actions of said type lever actions with said coupling means for shifting said coupling means to said second position when said type lever actions are operated.

2. In a typewriter, in combination, a carriage movement control arrangement comprising a carriage element and a type lever carrier element, one of said elements being shiftable relative to the other element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting one of said members for movement with said shiftable element in said first direction between a lower case position and an upper case position; a plurality of first type lever actions and a plurality of second type lever actions, each type lever action including a part for shifting said control member in said second direction when said type lever action is operated; coupling means having a first position connecting said control member with said escapement member in one of said case positions of said one movable member so that said escapement member effects a carriage step when said control member is shifted by said part of a type lever action, and having a second position connecting said control member with said escapement member in said one case position of said one movable member and disconnecting said control member from said escapement member in the other case position of said one movable member; and means for connecting only said second type lever actions with said coupling means for shifting said coupling means to said second position when said second type lever actions are operated whereby operation of said first type lever actions effects a carriage step in said lower and upper case positions of said shiftable element, whereas operations of said second type lever action effects a carriage step only in one of said case positions, and no carriage step in the other case position.

3. In a typewriter, in combination, a carriage movement control arrangement comprising a carriage element and a type lever carrier element, one of said elements being shiftable relative to the other element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting one of said members for movement with said shiftable element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member, said coupling lever having a coupling abutment at the free end thereof moving in said first direction during pivotal movement of said coupling lever between a first position in which said coupling abutment is positioned for engagement with said control member in said lower case position and in said upper case position so that said escapement member effects a carriage step when said control member is shifted by said part of a type lever action, and a second position in which said coupling abutment is positioned for engagement with said control member only in said lower case position, and is located outside of the path of movement of said control member in said second direction in said upper case position; and means for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

4. In a typewriter, in combination, a carriage movement control arrangement comprising a carriage element, and a type lever carrier element, said type lever carrier element being shiftable relative to said carriage element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said control member for movement with said type lever carrier element in said first direction between a lower case position and an upper case position; a plurality of first type lever actions and a plurality of second type lever actions, each type lever action including a part for shifting said control member in said second direction when said type lever action is operated; coupling means having a first position connecting said control member with said escapement member in one of said case positions so that said escapement member effects a carriage step when said control member is shifted by said part of a type lever action, and having a second position connecting said control member with said escapement member in said one case position and disconnecting said control member from said escapement member in the other case position; and means for connecting only said second type lever actions with said coupling means for shifting said coupling means to said second position when said second type lever actions are operated whereby operation of said first type lever actions effects a carriage step in said lower and upper case positions of said shiftable element, whereas operation of said second type lever action effects a carriage step only in one of said case positions, and no carriage step in the other case position.

5. In a typewriter, in combination, a carriage movement control arrangement comprising a carriage element and a type lever carrier element, said carriage element being shiftable relative to said type lever carrier element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said escapement member for movement with said carriage element in said first direction between a lower case position and an upper case position; a plurality of first type lever actions and a plurality of second type lever actions, each type lever action including a part for shifting said control member in said second direction when said type lever action is operated; coupling means having a first position connecting said control member with said escapement member in one of said case positions so that said escapement member effects a carriage step when said control member is shifted by said part of a type lever action, and having a second position connecting said control member with said escapement member in said one case position and disconnecting said control member from said escapement member in the other case position; and means for connecting only said second type lever actions with said coupling means for shifting said coupling means to said second position when said second type lever actions are operated whereby operation of said first type lever actions effects a carriage step in said lower and upper case positions of said shiftable element, whereas operation of said second type lever action effects a carriage step only in one of said case positions, and no carriage step in the other case position.

6. In a typewriter, in combination, a carriage movement control arrangement comprising a carriage element and a type lever carrier element, said type lever carrier element being shiftable relative to said carriage element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said control member for movement with said type lever carrier element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member, said coupling lever having a coupling abutment at the free end thereof moving in said first direction during pivotal movement of said coupling lever between a first position in which said coupling abutment is positioned for engagement with said control member in said lower case position and in said upper case position so that said escapement member effects a carriage step when said control member is shifted by said part of a type lever action, and a second position in which said coupling abutment is positioned for engagement with said control member only in said lower case position, and is located outside of the path of movement of said control member in said second direction in said upper case position; and means for connecting only said second type lever actions with said coupling lever for shifting said coupling lever to said second position when said second type lever action is operated whereby operation of said first type lever actions effects a carriage step in said lower and upper case positions of said shiftable element, where as operation of said second type lever actions effects a carriage step only in said lower case position, and no carriage step in said upper case position.

7. A carriage movement control arrangement as set forth in claim 8 wherein said coupling abutment is a plate member having first and second adjacent plate portions, respectively located opposite said control member when said carrier element is in said upper and lower case position and said coupling abutment is in said first position whereas when said coupling abutment is in said second position, said second portion is located opposite said control member in said lower case position and staggered in said first direction to said control member in said upper case position.

8. In a typewriter, in combination, a carriage movement control arrangement comprising a carriage element and a type lever carrier element, said carriage element being shiftable relative to said type lever carrier element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said escapement member for movement with said carriage element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member for movement with the same and with said carriage element, said coupling lever having a coupling abutment at the free end thereof moving in said first direction during pivotal movement of said coupling lever caused by movement of said escapement member with said carriage element between two first positions in which said coupling abutment is positioned for engagement with said control member in said lower case position and in said upper case position so that said escapement member effects a carriage step when said control member is shifted by said part of a type lever action, said coupling lever having a second position in which said coupling abutment is positioned for engagement with said control member only in said lower case position, said is located outside of the path of movement of said control member in said second direction in said upper case position; and means for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

9. A carriage movement control arrangement as set forth in claim 8, wherein said coupling abutment is a plate member having a first plate portion and a second plate portion spaced in said first direction from said first plate portion by a recess in said plate member, said first plate portion being located opposite said control member when said carriage element is in said lower case position and said coupling abutment is in said first position, and said second plate portion being located opposite said control member when said carriage element is in said upper case position and said coupling abutment is in said first position whereas when said coupling abutment is in said second position and said carriage element is in said upper case position, said control member is located opposite said recess.

10. In a typewriter, in combination, a carriage movement control arrangement comprising a carriage element and a type lever carrier element, one of said elements being shiftable relative to the other element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting one of said members for movement with said shiftable element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member, said coupling lever having a coupling abutment at the free end thereof moving in said first direction during pivotal movement of said coupling lever between a first position in which said coupling abutment is positioned for engagement with said control member in said lower case position and in said upper case position so that said escapement member effects a carriage step when said control member is shifted by said part of a type lever action, and a second position in which said coupling abutment is positioned for engagement with said control member only in said lower case position, and is located outside of the path of movement of said control member in said second direction in said upper case position; and means including spring loaded lever means pivotally connected to said coupling lever and having an engaging portion located opposite said type lever actions for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

11. In a typewriter, in combination, a carriage movement control arrangement comprising a carriage element and a type lever carrier element, one of said elements being shiftable relative to the other element in a first direction between a lower case position and an upper case position; an escapement member operatively connected to said carrier element and shiftable in a second direction transverse to said first direction for effecting a carriage step; a control member shiftable in said second direction; means connecting one of said members for movement with said shiftable element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member, said coupling lever having a coupling abutment at the free end thereof moving in said first direction during pivotal movement of said coupling lever between a first position in which said coupling abutment is positioned for engagement with said control member in said lower case position and in said upper case position so that said escapement member effects a carriage step when said control member is shifted by said part of a type lever action, and a second position in which said coupling abutment is positioned for engagement with said control member only in said lower case position, and is located outside of the path of movement of said control member in said second direction in said upper case position; and means including spring loaded lever means pivotally connected to said coupling lever and having an engaging portion extending across said type lever actions, said engaging portion having recesses registering with said first type lever actions, and projections cooperating with said second type lever actions for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

12. An arrangement as set forth in claim 5 and including dead key type lever actions spaced from said control member so that the same is not shifted upon operation of said dead key type lever actions; and wherein said parts of said first and second type lever actions are projections missing on said dead key type lever actions.

13. An arrangement as set forth in claim 5, wherein said control member includes an arcuate part mounted in said type lever carrier for movement in said second direction; and wherein each of said type lever actions includes a type lever having said part; an arcuate shaft mounted on said type lever carrier and supporting said type levers of said first and second type lever actions for turning movement in a position in which said parts are disposed in an arc matching said arcuate part of said control member.

14. In a typewriter, in combination, a carriage movement control arrangement comprising a carriage element and a type lever carrier element, said type lever carrier element being shiftable relative to said carriage element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said control member for movement with said type lever carrier element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member, said coupling lever having a coupling abutment at the free end thereof moving in said first direction during pivotal movement of said coupling lever between a first position in which said coupling abutment is positioned for engagement with said control member in said lower case position and in said upper case position so that said escapement member effects a carriage step when said control member is shifted by said part of a type lever action and a second position in which said coupling abutment is positioned for engagement with said control member only in said lower case position, and is located outside of the path of movement of said control member in said second direction in said upper case position; and means including spring loaded lever means pivotally connected to said coupling lever and having an engaging portion extending across said type lever actions, said engaging portion having recesses registering with said first type lever actions, and projections cooperating with said second type lever actions for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

15. An arrangement as set forth in claim 14, wherein said engaging portion has arms at the ends thereof; and including a shaft supporting said arms and thereby said lever means for turning movement; and wherein each type lever action includes a key lever, said key levers being mounted on said shaft.

16. In a typewriter, in combination, a carriage movement control arrangement comprising, a carriage element and a type lever carrier element, said carriage element being shiftable relative to said type lever carrier element in a first direction between a lower case position and an upper case position; an escapement member operatively connected to said carrier element and shiftable in a second direction transverse to said first direction for effecting a carriage step; a control member mounted on said carrier element for shifting movement only in said second direction; means connecting said escapement member for movement with said carriage element in said first direction between a lower case position and an upper case position; a plurality of first type lever actions and a plurality of second type lever actions, each type lever action including a part for shifting said control member in said second direction when said type lever action is operated; a coupling means including a coupling lever pivotally mounted on said escapement member for movement with the same and with said carriage element, said coupling lever having a coupling abutment at the free end thereof moving in said first direction during pivotal movement of said coupling lever, caused by movement of said escapement member with said carriage element between two first positions in which said coupling abutment is positioned for engagement with said control member in said lower case position and in said upper case position so that said escapement member effects a carriage step when said control member is shifted by said part of said type lever action, said coupling lever having a second position in which said coupling abutment is positioned for engagement with said control member only in said lower case position, and is located outside of the path of movement of said control member in said second direction in said upper case position; and means including spring loaded lever means pivotally connected to said coupling lever and having an engaging portion extending across said type lever actions, said engaging portion having recesses registering with said first type lever actions, and projections cooperating with said second type lever actions for connecting only said second type lever actions with said coupling lever for shifting said coupling lever to said second position when said second type lever action is operated whereby operation of said first type lever actions effects a carriage step in said lower and upper case positions of said shiftable element, whereas operation of said second type lever actions effects a carriage step only in said lower case position, and no carriage step in said upper case position.

17. An arrangement as set forth in claim 16, wherein said engaging portion has arms at the ends thereof; and including a shaft supporting said arms and thereby said lever means for turning movement; and wherein each type lever action includes a key lever, said key levers being mounted on said shaft.

18. An arrangement as set forth in claim 16, wherein shifting of said carriage element to said upper case position turns said coupling lever an angular distance in one direction, and shifting of said coupling lever by said lever means turns said coupling lever one half of said angular distance in the opposite direction.

References Cited in the file of this patent

UNITED STATES PATENTS

| | | |
|---|---|---|
| 730,456 | Helmond et al. | June 9, 1903 |
| 1,185,299 | Felbel | May 30, 1916 |
| 1,439,669 | Helmond | Dec. 19, 1922 |
| 1,458,251 | Stickney | June 12, 1923 |
| 1,504,198 | Nemcovsky | Aug. 5, 1924 |
| 1,670,513 | Kurowski | May 22, 1928 |